United States Patent [19]
Takaku et al.

[11] Patent Number: 5,791,227
[45] Date of Patent: Aug. 11, 1998

[54] CONTROL VALVE

[75] Inventors: Hitoshi Takaku; Isao Kobayashi; Yoshiyuki Hirathuka, all of Saitama-Ken, Japan

[73] Assignee: Jidosha Kiki Co., Ltd., Tokyo, Japan

[21] Appl. No.: 740,251

[22] Filed: Oct. 25, 1996

[30] Foreign Application Priority Data

| Nov. 17, 1995 | [JP] | Japan | 7-323663 |
| Mar. 29, 1996 | [JP] | Japan | 8-104052 |
| Apr. 30, 1996 | [JP] | Japan | 8-132877 |

[51] Int. Cl.[6] .................................................. F15B 13/04
[52] U.S. Cl. .......................... 91/32; 91/390; 91/376 R; 137/627.5
[58] Field of Search ........................ 91/4, 32, 376 R, 91/390; 137/596.17, 627.5

[56] References Cited

U.S. PATENT DOCUMENTS

| 3,082,744 | 3/1963 | Gardner | 91/376 R |
| 3,605,813 | 9/1971 | Nakano et al. | 137/627.5 |
| 4,565,209 | 1/1986 | Ruchser et al. | 137/627.5 |
| 5,096,267 | 3/1992 | Volz | 91/376 R |
| 5,235,897 | 8/1993 | Watanabe . | |

FOREIGN PATENT DOCUMENTS

| 3827013 | 2/1990 | Germany | 137/627.5 |
| 61-215156 | 9/1986 | Japan . | |

*Primary Examiner*—F. Daniel Lopez
*Attorney, Agent, or Firm*—Flynn, Thiel, Boutell & Tanis, P.C.

[57] ABSTRACT

A control valve is disclosed which is capable of supplying a required control pressure to an actuator such as a brake booster, for example. The control valve includes a valve mechanism within a housing, and the valve mechanism comprises a piston which is associated with a solenoid. When the solenoid is excited, the piston is driven for movement to switch a flow path within the housing. In this manner, the atmosphere, acting as a control pressure, is introduced into a variable pressure chamber defined within the housing. The atmosphere which is introduced into the variable pressure chamber is arranged to push back the piston, so that a control pressure which depends on the magnitude of a current passing through the solenoid can be generated within the variable pressure chamber. As compared with a prior art arrangement, the control valve of the invention reduces the cost of the entire arrangement, and allows a piping arrangement for pressure fluid to be simplified.

10 Claims, 5 Drawing Sheets

CONTROL VALVE

FIELD OF THE INVENTION

The invention relates to a control valve, and more particularly, to a control valve capable of supplying a required controlled pressure to a pressure chamber of an actuator, for example.

DESCRIPTION OF THE PRIOR ART

A control valve which introduces a required control pressure into an actuator to actuate it is known in the art, as disclosed in Japanese Laid-Open Patent Application No. 215,156/86, for example. The arrangement disclosed in this Application employs a control valve comprising a plurality of solenoid operated switching valves, the operation of which is controlled by a controller so as to supply a required controlled pressure to the actuator. However, because the plurality of solenoid operated switching valves are used to construct the control valve, there are disadvantages that the overall arrangement is expensive and that a piping arrangement to permit a flow of pressure fluid becomes complex.

SUMMARY OF THE INVENTION

In view of the foregoing, the invention provides a control valve including a negative pressure chamber defined within a housing and in which a negative pressure is maintained, a variable pressure chamber formed within the housing, an atmosphere chamber formed within the housing and into which the atmosphere is introduced, a valve mechanism disposed within the housing for switching communication between the individual chambers, and a solenoid for operating the valve mechanism. In accordance with the invention, the valve mechanism comprises a piston disposed within the housing so as to be movable and adapted to be driven for movement when the solenoid is excited, a diaphragm extending across the piston and the housing to define the negative pressure chamber and the atmosphere chamber, a negative pressure valve for interrupting a communication between the negative pressure chamber and the variable pressure chamber upon movement of the piston, and an atmosphere valve for establishing a communication between the atmosphere chamber and the variable pressure chamber upon movement of the piston. The diaphragm is substantially cylindrical in configuration, and has its one axial end connected to the housing while the other end is outwardly folded back upon itself toward said one end, with an inner periphery which is located toward the other end beyond the folded end being fitted around the outer peripheral surface of the piston in close contact therewith.

With the described arrangement, when the solenoid is excited, the piston is driven for movement, whereupon the negative pressure valve interrupts a communication between the negative pressure chamber and the variable pressure chamber while the atmosphere valve establishes a communication between the atmosphere chamber and the variable pressure chamber, thus introducing the atmosphere, which acts as a control pressure, into the variable pressure chamber. The negative pressure in the negative pressure chamber then acts upon one surface of the diaphragm while the atmospheric pressure, acting as a control pressure, acts upon the other surface of the diaphragm. A pressure differential between the control pressure or the atmospheric pressure and the negative pressure causes the piston, which is driven for movement by the solenoid, to be urged back. In this manner, a control pressure which depends on the magnitude of a current passing through the solenoid can be generated within the variable pressure chamber.

Since a required control pressure can be generated in this manner by means of a single control valve, the cost required for the overall arrangement which incorporates the control valve of the invention is reduced and a piping arrangement for passing pressure fluid can be simplified as compared with a prior art arrangement.

Above and other objects, features an advantages of the invention will become apparent from the following description with reference to the drawings.

DETAILED DESCRIPTION OF THE EMBODIMENT

Figure 1:
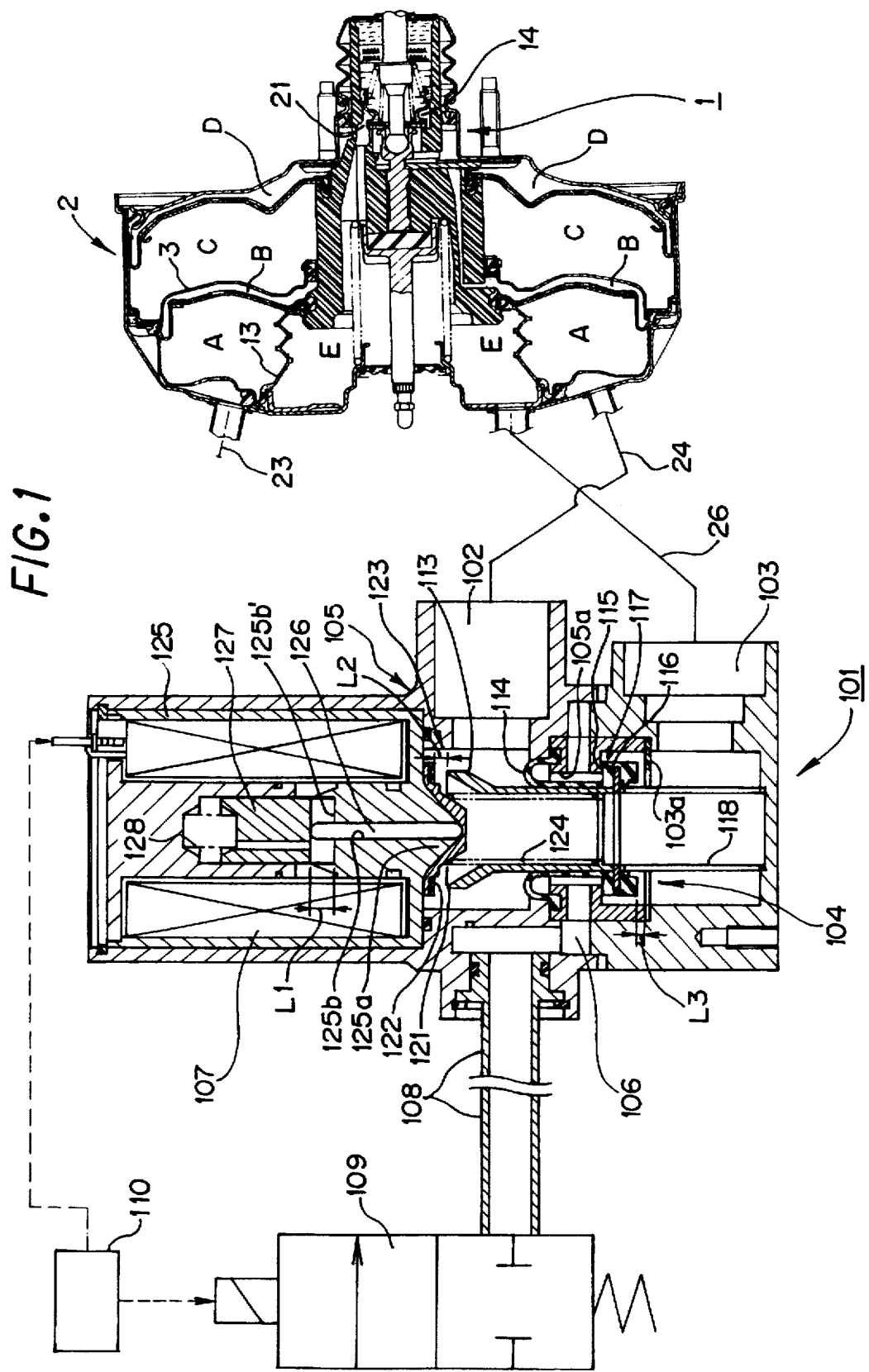
FIG. 1 is a cross section of one embodiment of the invention.

Referring to the drawings, several embodiments of the invention shown will now be described. Specifically, referring to FIGS. 1 and 2, there is shown a brake booster 1 of tandem type which is known in the art and which is associated with a control valve 101 acting to introduce a control pressure into the brake booster 1. The booster 1 has a similar arrangement as known in the art, exemplified by U.S. Pat. No. 5,235,897, including a shell 2, the interior of which is partitioned by a center plate 3 into a front chamber 4 and a rear chamber 5 which are disposed on the opposite sides thereof. A tubular valve body 6 slidably extends through an opening, formed in a rear wall 2A of the shell 2 and an axial portion of the center plate 3, with a hermetic seal being maintained by seal means.

A front power piston 7 and a rear power piston 8 are connected to the outer periphery of the valve body 6 at locations which are disposed within the front chamber 4 and the rear chamber 5, respectively, and a front diaphragm 11 and a rear diaphragm 12 are applied to the back surfaces of the power pistons 7, 8, respectively. In this manner, a constant pressure chamber A and a variable pressure chamber B are defined across the front diaphragm 11 while another constant pressure chamber C and another variable pressure chamber D are defined across the rear diaphragm 12.

Bellows 13 is disposed within the constant pressure chamber A, and has its rear end connected to and hermetically retained by the front end of the valve body 6 around its outer periphery while the front end of the bellows 13 is held in abutment against a front wall surface 2B of the shell 2 by means of a support member 9. The bellows 13 divides the interior of the constant pressure chamber A into a bellows chamber E, which is defined inside the bellows 13, and an outer space.

VALUE MECHANISM

A valve mechanism 14, which is in itself known in the art, is disposed within the valve body 6 for switching communication between the constant pressure chambers A, C and the variable pressure chambers B, D. Specifically, the valve mechanism 14 comprises an angular, first valve seat 15 formed around the valve body 6, an angular, second valve seat 17 formed around a valve plunger 16 slidably disposed within the valve body 6, at a location radially inward of the first valve seat 15, and a valve element 18 which is adapted to be seated upon either valve seat 15 or 17 under the resilience of a spring.

A vacuum valve 21 is formed by a combination of the first valve seat 15 and an annular seat area of the valve element 18 which is adapted to be engaged with or disengaged from the valve seat 15. The space which is located radially outward of the vacuum valve 21 communicates with the bellows chamber E through a first constant pressure passage 22 which is formed in the valve body 6.

Figure 2:
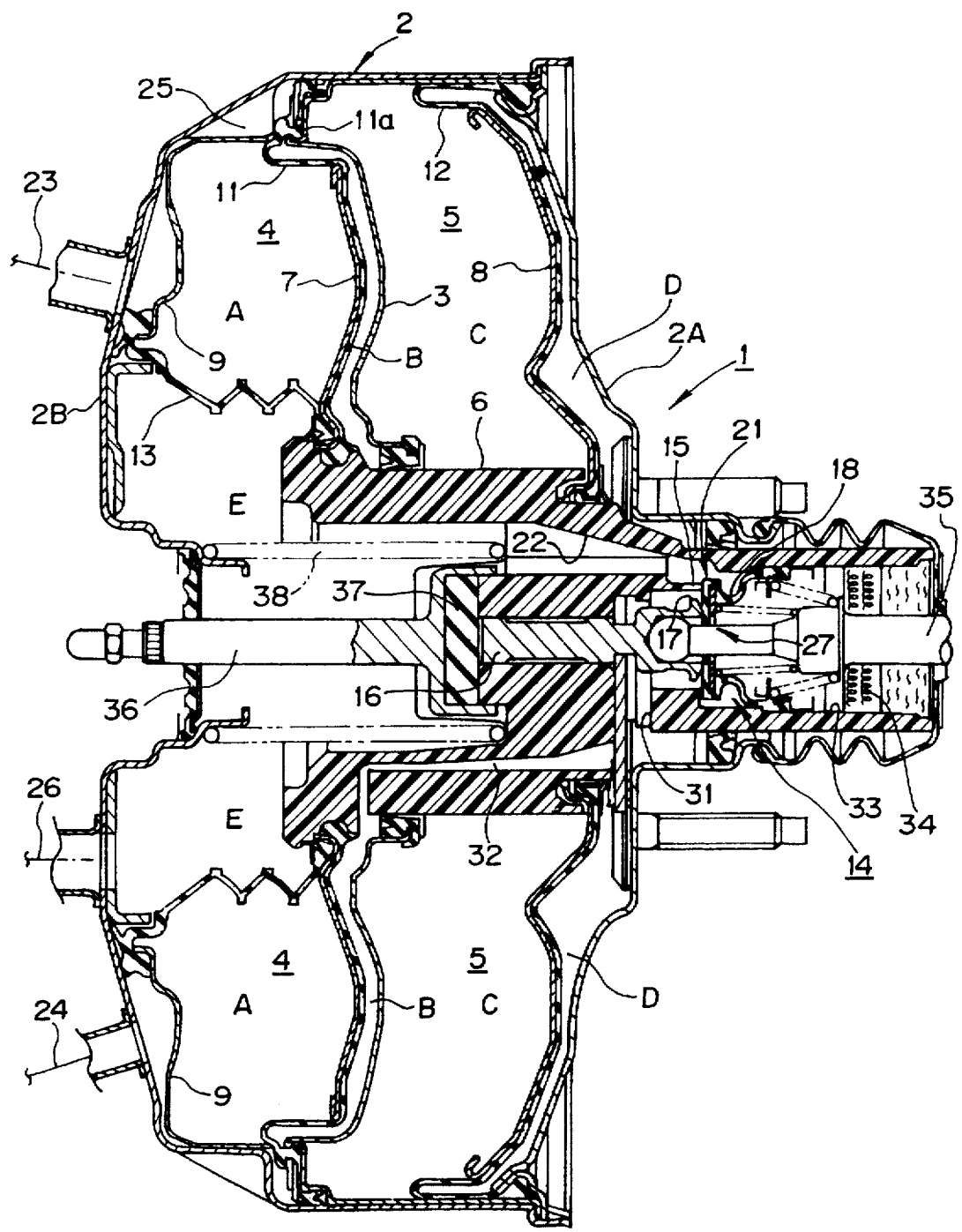
FIG. 2 is a cross section, to an enlarged scale, of part of FIG. 1.

The interior of the constant pressure chamber A which is located outside the bellows chamber E is maintained in communication with a source of negative pressure, not shown, through a conduit 23, and accordingly, a negative pressure is normally introduced into the constant pressure chamber A in a space located outside the bellows chamber E. In addition, the interior of the constant pressure chamber A located outside the bellows chamber E communicates with a negative pressure chamber 102 of the control valve 101 through another conduit 24. As shown in FIG. 2, the interior of the constant pressure chamber A located outside the bellows chamber E is maintained in communication with the constant pressure chamber C through a second constant pressure passage 25, disposed adjacent to, and radially outward of a bead 11a extending around the outer periphery of the front diaphragm 11. In this manner, a negative pressure is normally introduced into the constant pressure chamber A in a space radially outward of the bellows chamber E and into the rear constant pressure chamber C.

On the other hand, the bellows chamber E communicates with variable pressure chamber 103 of the control valve 101 through a conduit 26. As will be described in detail later, by operating the valve mechanism 104 of the control valve 101 to switch a flow path within the control valve 101, a negative pressure or the atmosphere, acting as a control pressure, can be selectively introduced into the bellows chamber E. When the atmosphere is introduced into the bellows chamber E under the inoperative condition of the brake booster 1, the brake booster 1 can be operated to function as an automatic brake, without operating a brake pedal.

An atmosphere valve 27 is formed by a combination of the second valve seat 17 and a seat area of the valve element 18 which is adapted to be engaged with or disengaged from the valve seat 17. A space located radially inward of the vacuum valve 21, but is located radially outward of the atmosphere valve 27 communicates with the variable pressure chamber D through a radially extending, first variable pressure passage 31 which is formed in the valve body 6. The variable pressure chamber D in turn communicates with the variable pressure chamber B through a second variable pressure passage 32 which is formed in the valve body 6.

Finally, a space located radially inward of the atmosphere valve 27 communicates with the atmosphere through an atmosphere passage 33 defined by the inner peripheral surface of the valve body 6 and through a filter 34 disposed therein.

The right end of the valve plunger 16 is connected to an input shaft 35 which is mechanically coupled to a brake pedal, not shown, while the left end of the valve plunger 16 is disposed in opposing relationship with a reaction disc 37 which is received in one end of an output shaft 36. The left end of the output shaft 36 is mechanically coupled to a piston of a master cylinder, not shown, after extending through an opening formed in a wall 2B of the shell 2.

A return spring 38 is disposed across the valve body 6 and the wall 2B of the shell 2, allowing the valve body 6 to be returned to its inoperative position shown.

The construction of the brake booster 1 of tandem type mentioned above is basically the same as known in the art, as exemplified by U.S. Pat. No. 5,235,897.

CONSTRUCTION OF CONTROL VALUE 101

As shown in FIG. 1, the control valve 101 of the present embodiment includes the negative pressure chamber 102, the variable pressure chamber 103 and an atmosphere chamber 106, all formed within a housing 105, as well as a valve mechanism 104 which switches communication between these chambers. In addition, the control valve 101 includes a solenoid 107, acting as an actuator which actuates the valve mechanism 104. When a controller 110 excites the solenoid 107, a control pressure which depends on the magnitude of a current passing through the solenoid 107 is generated within the control valve 101, and the atmosphere having such control pressure is introduced into the bellows chamber E.

The variable pressure chamber 103 which is formed within the housing 105 toward the bottom thereof is maintained in communication with the bellows chamber E through the conduit 26 as described above. The negative pressure chamber 102 which is formed in the housing 105 toward the top thereof communicates with the constant pressure chamber A in a space located outside the bellows chamber E, through the conduit 24, also as described above. Accordingly, a negative pressure is normally introduced into the negative pressure chamber 102 through the conduit 24. One end of a conduit 108 is connected to the atmosphere chamber 106 while the other end of the conduit 108 is attached to a solenoid operated switching valve 109. The switching valve 109 is adapted to be operated by the controller 110. In the inoperative condition of the solenoid 107 as shown in FIG. 1, the valve 109 is not operated, and accordingly the other end of the conduit 108 is closed, thus preventing the introduction of the atmosphere into the atmosphere chamber 106. By contrast, when the solenoid 107 is excited, the switching valve 109 is also operated to be depressed, whereupon the introduction of the atmosphere into the atmosphere chamber 106 is permitted.

A vertically extending communication opening 105a is formed within the housing 105 of the control valve 101, and the valve mechanism 104 is disposed to extend across the communication opening 105a and the chambers 102, 103 and 106. The valve mechanism 104 includes a cylindrical piston 113, which extends through the communication opening 105a. A diaphragm 114, formed of rubber, extends across the piston 113 and the bottom surface of the negative pressure chamber 102. The top end of the piston 113 is disposed within the negative pressure chamber 102 while the bottom end of the piston 113 and the lower end of the diaphragm 114 are located within the variable pressure chamber 103.

In the present embodiment, the diaphragm 114 is generally substantially tubular as a whole in its natural condition before assembly, and its opposite axial ends have a greater wall thickness than the central position thereof, and the outer diameter of the opposite ends is greater than that of the communication opening 105a. Also, in its natural condition before assembly, the diaphragm 114 has an inner diameter which is slightly less than the external diameter of the piston 113 at its bottom portion. The outer periphery of the piston 113 is disposed as a gentle press fit into the inner periphery of the diaphragm 114 thus constructed. In this manner, the inner periphery of the diaphragm 114 at its bottom portion is disposed in close contact with the outer periphery of the piston 113 at its bottom portion, whereby the piston 113 is held by diaphragm 114 and the bottom end of the piston 113 is located inside the bottom end of the diaphragm 114 which has an increased wall thickness.

A ring-shaped stop 103a is secured to a given location within the variable pressure chamber 103 which is disposed below the bottom end of the diaphragm 114, thus defining a lower end position when the diaphragm 114 and the piston 113 move down.

On the other hand, the upper portion of the diaphragm 114 is outwardly folded back upon itself so as to be located outside the lower portion, and the axial end of the diaphragm 114 which has an increased thickness is embedded into the bottom surface of the negative pressure chamber 104 while maintaining its surrounding relationship which respect to the communication opening 15a. In this manner, the axial end of the diaphragm 114 is connected to the bottom surface of the negative pressure chamber 102 while maintaining a hermetic seal therebetween.

As described, in distinction to the prior art practice in which the diaphragm 114 is secured to the piston 113, in the present embodiment, the diaphragm 114 is simply fitted around piston 113 in close contact therewith. The inner peripheral surface which defines the communication opening 5a is entirely covered by the outer periphery of the diaphragm 114 at its bottom portion which is disposed in this manner, whereby the negative pressure chamber 102 and the atmosphere chamber 106 are defined across the diaphragm 114.

A stepped end face which represents a boundary between the variable pressure chamber 103 and communication opening 105a is formed as a first valve seat 115, and a portion of an increased thickness which is defined by the bottom end of the diaphragm 114 and which is located below the valve seat 115 is formed as a first valve element 116. A combination of the first valve seat 115 and the first valve element 116 forms an atmosphere valve 117 which switches a communication between the variable pressure chamber 103 and the atmosphere chamber 106.

A spring 118 is disposed between the bottom end of the diaphragm 114 and the bottom surface of the variable pressure chamber 103, whereby the piston 113 and the diaphragm 114 are normally urged upward so as to assume their inoperative positions shown. Under the inoperative condition when the solenoid 107 is not excited, the resilience of the spring 118 causes the first valve element 116 to be seated upon the first valve seat 115, thus closing the atmosphere valve 117. Accordingly, a communication between the atmosphere chamber 106 and the variable pressure chamber 103 is interrupted.

An upper portion of the piston 113 which is disposed within the negative pressure chamber 102 is tapered so as to have its diameter increasing toward the top end, which is formed as a second valve element 121. A second valve seat 122 which is generally conical in configuration and which is moveable is disposed above and close to the second valve element 121. A combination of the second valve element 121 and the second valve seat 122 which is adapted to engage with or disengage from the second valve element 121 forms a negative pressure valve 123 which switches a communication between the negative pressure chamber 102 and the variable pressure chamber 103. A spring 124 is disposed between the second valve seat 122 and a step formed around the inner periphery of the piston 113, and the resilience of the spring 124 urges the second valve seat 122 and the second valve element 121 (piston 113) so that they may be normally maintained spaced apart.

The solenoid 107 disposed above the second valve seat 122 includes a frame 125 which is fitted into the housing 105 so as to maintain a hermetic seal therebetween. A conical projection 125a which is formed in the axial portion of the frame 125 is disposed to face the negative pressure chamber 102. The second valve seat 122 is disposed below and close to the projection 125a, and since the second valve seat 122 is urged by the spring 124, the entire back surface of the second valve seat 122 engages the projection 125a from below when the solenoid 107 is not excited.

A stepped guide opening 125b is formed to extend through the axial portion of the frame 125 or the axial portion of the projection 125a, and includes a portion of a reduced diameter in its lower portion through which a first rod 126 having a reduced diameter slidably extends. The guide opening 125b also includes a portion of an increased diameter in its upper portion in which a second rod 127 of a greater diameter which is formed of a magnetizable material is slidably fitted.

A spring 128 is disposed between the upper surface of the second rod 127 and an opposing bottom surface of the guide opening 125b, whereby the lower end face of the second rod 127 abuts against the upper end of the first rod 126 and the lower end of the first rod 126 abuts against the back surface of the second valve seat 122 in its axial portion, and the both rods 126, 127 under such condition as well as the second valve seat 122 are normally urged downward.

It is to be noted that the resilience of the spring 118 disposed in the variable pressure chamber 103 is chosen to be greater than the combined resilience of the both springs 128, 124, and the resilience of the spring 128 is chosen to be less than the resilience of the spring 124.

In the inoperative condition shown, representing a spacing between the lower end face of the second rod 127 and the stepped end face 125b' of the guide opening 125b which is disposed in opposing relationship therewith by L1, a spacing between the second valve element 121 and the second valve seat 122 by L2, and a spacing between the bottom end of the diaphragm 114 and the stop 103a by L3, these spacings are chosen in the present embodiment to satisfy the following relationship:

L1>L2+L3

OPERATION

In the inoperative condition shown, since the solenoid 107 is not excited, the atmosphere valve 117 of the control valve 101 is closed, and the second valve element 121 disposed within the negative pressure chamber 102 is at its raised end position. The second valve seat 122 assumes its inoperative position in which it engages the projection 125a, whereby the both rods 126, 127 remains stationary at their retracted (raised) ends. At this time, the second valve element 121 and the second valve seat 122 are spaced from each other, and accordingly, the negative pressure valve 123 is open, thus allowing a communication between the negative pressure chamber 102 and the variable pressure chamber 103 through the internal space within the piston 113. Under this condition, a communication is established between the bellows chamber E and the constant pressure chamber A which is located outside thereof through the both conduits 24, 26, the negative pressure chamber 102 and the variable pressure chamber 103, whereby a negative pressure is introduced into the both chambers A, E.

Since in the brake booster 1 of tandem type in its inoperative condition, the vacuum valve 21 is open while the atmosphere valve 27 is closed as known in the art, the negative pressure is introduced, not only into the both chambers A, E, but also into the remaining chambers B, C and D.

Accordingly, when a brake pedal, not shown, is depressed under this inoperative condition, the atmosphere valve 27 is opened while the vacuum valve 21 is closed in the booster 1, whereupon a pressure differential is developed between the constant pressure chambers A, C and variable pressure chambers B, D, to operate the brake booster 1 in the manner known in the art, producing a braking liquid pressure in accordance with the force with which the brake pedal is depressed.

When it is desired to operate the brake booster 1 of tandem type as an automatic braking unit, a required current is supplied from the controller 110 to the solenoid 107 to excite it under the inoperative condition shown, thus operating the solenoid operated switching valve 109.

Thereupon, the atmosphere is introduced into the atmosphere chamber 106, whereby a pressure differential between the atmosphere chamber 106 and the negative pressure chamber 102 causes the diaphragm 114 to be pressed around the outer periphery of the piston 113 more tightly while aligning the axis of the piston 113 with the axes of the both valve seats 122, 115. Since the solenoid 107 is excited, the resulting magnetic force causes the second rod 127 to be driven downward against resilience of the spring 124.

Concomitantly, the second valve seat 122 is driven downward against the resilience of the spring 124, and the second valve seat 122 becomes seated upon the second valve element 121, thus closing the negative pressure valve 123. This interrupts a communication between the negative pressure chamber 102 and the variable pressure chamber 103. Under this condition, the second valve seat 122 and the piston 113, which are integrally coupled together, are driven further downward against the resilience of the spring 118, whereby the first valve element 116 moves away from the first valve seat 115, establishing a communication between the atmosphere chamber 106 and the variable pressure chamber 103. This allows the atmosphere to be introduced into the bellows chamber E of the brake booster 1 through the conduit 26 after the atmosphere within the atmosphere chamber 106 is introduced into the variable pressure chamber 103. Accordingly, in this instance, the atmosphere can be introduced into the both variable pressure chambers B, D from the bellows chamber E without operating the brake pedal, allowing the brake booster 1 of tandem type to function as an automatic brake.

The atmosphere which is introduced into the variable pressure chamber 103 of the control valve 101 acts upon the second valve seat 122 through the internal space of the piston 113, thus allowing both rods 126, 127 which are urged downward under the influence of the magnetic force to be pushed back. The described arrangement allows the atmosphere having a control pressure which depends on the magnitude of a current passing through the solenoid 107 to be introduced into the bellows chamber E.

As described above, in the present embodiment, the diaphragm 114 of the control valve 101 is not secured to the piston 113, but is fitted around it in close contact therewith to maintain a hermetic seal therebetween. Accordingly, a sealing structure between the both members can be simplified, permitting the control valve 101 to be manufactured in a smaller size as compared with the prior art in which the diaphragm 114 is secured to the piston 113.

When the solenoid 107 is excited, a pressure differential between the atmosphere within the atmosphere chamber 106 and a negative pressure within the negative pressure chamber 102 causes the diaphragm 114 to be pressed around the outer peripheral surface of the piston 113 more tightly, thus enabling a hermetic seal between the diaphragm 114 and the piston 113 to be maintained in a reliable manner with the described construction. In addition, when the solenoid is excited, the pressure differential also serves aligning the piston 113 with respect to the both valve seats 115, 122, contributing to enhancing the reliability of the switching operation for the atmosphere valve 117 and the negative pressure valve 123.

In the present embodiment, the provision of the solenoid operated switching valve 109 allows for the introduction of the atmospheric pressure into the atmosphere chamber 106 of the control valve 101 to be prevented in the inoperative condition of the control valve 101. Accordingly, if the diaphragm 114 is broken or in the event the atmosphere valve 117 is not completely closed in the inoperative condition, an inadvertent introduction of the atmosphere into the bellows chamber E is avoided. Thus, the brake booster 1 of tandem type can not be operated inadvertently as an automatic brake on account of a failure of the diaphragm 114 or the like, independently from the intent of a driver.

Since a required control pressure can be generated with a single control valve 101 in the present embodiment, when compared with a prior art arrangement in which a corresponding control valve comprises a plurality of solenoid operated switching valves, the cost of the entire arrangement can be reduced and a piping arrangement for pressure fluid can be simplified with the use of the control valve 101.

SECOND EMBODIMENT

Figure 3:
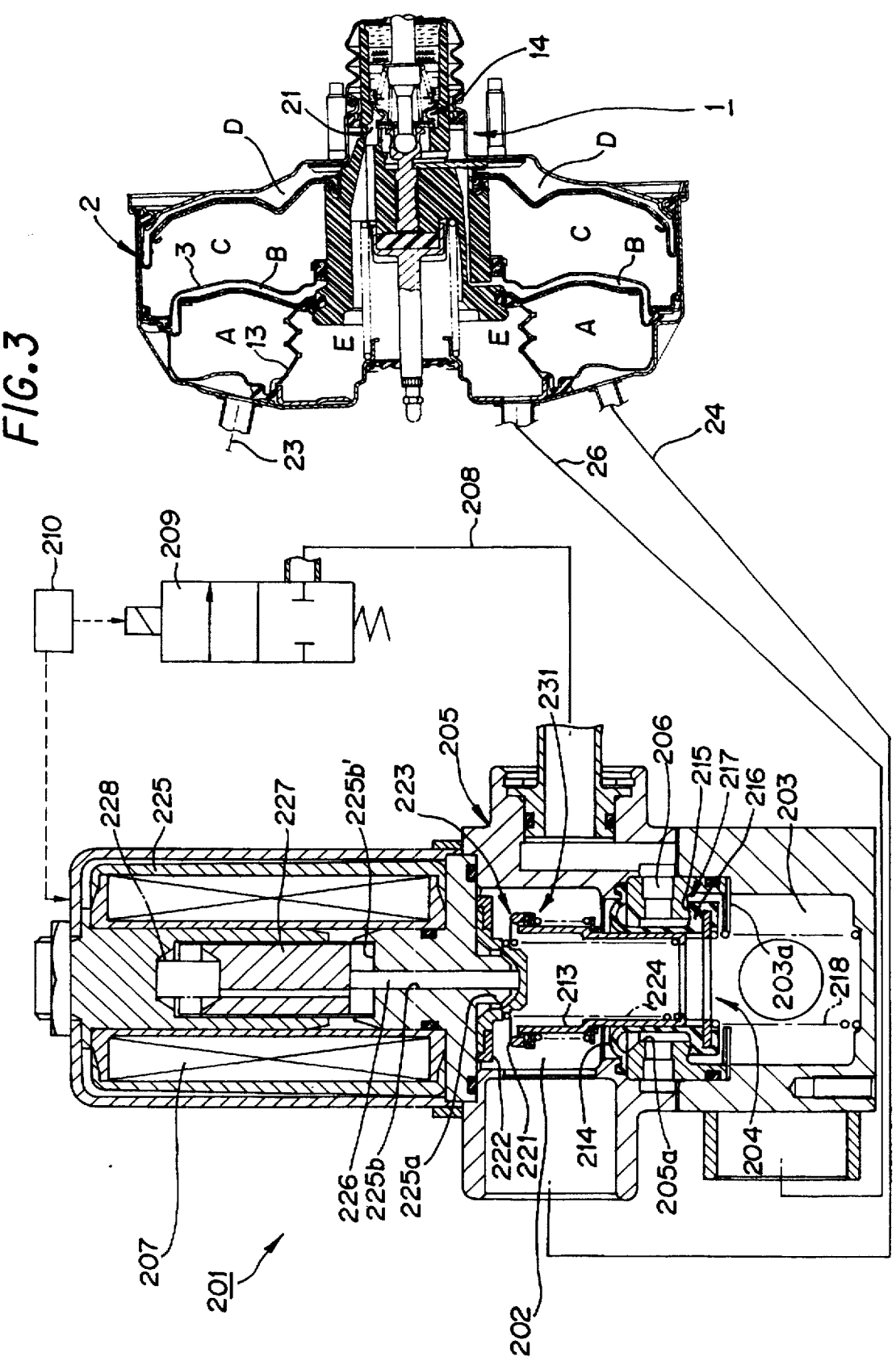
FIG. 3 is a cross section of a second embodiment of the invention.

FIG. 3 shows a second embodiment of the invention, which is based on the arrangement of the first embodiment and in which a relief valve 231 is added to a piston 213 of a control valve 201.

Figure 4:
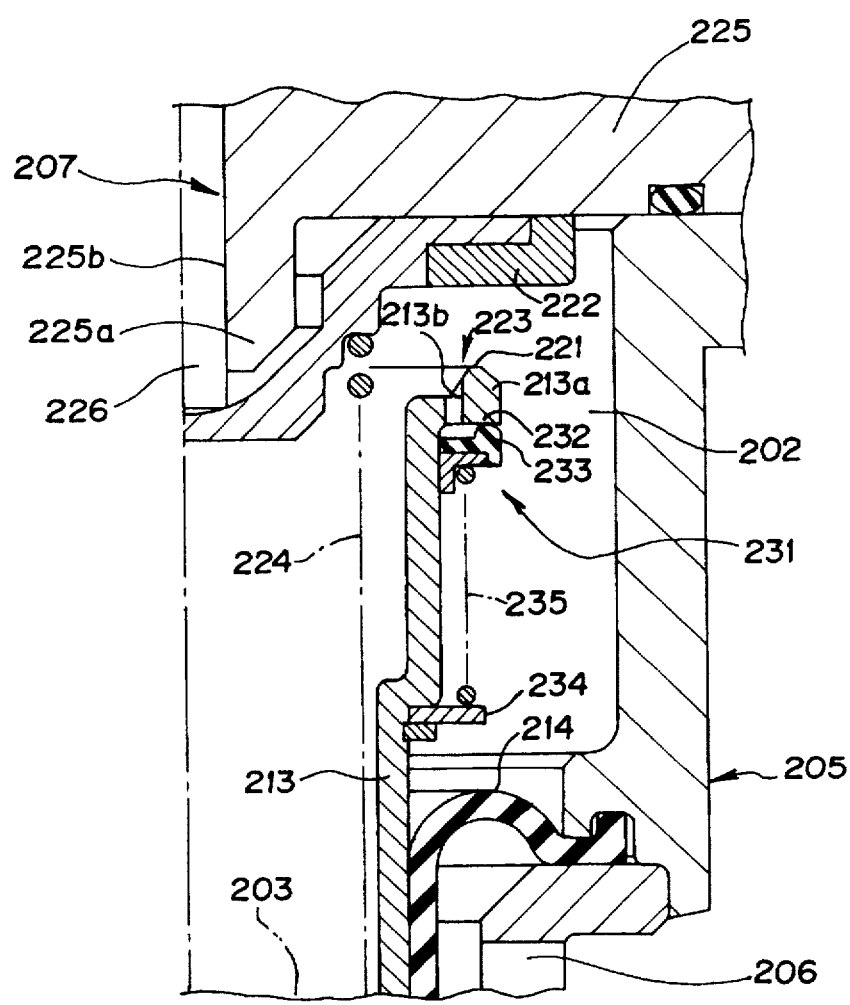
FIG. 4 is a cross section, to an enlarged scale, of part shown in FIG. 3.

Specifically, as shown to an enlarged scale in FIG. 4, an upper end of a piston 213 which is disposed within a negative pressure chamber 202 defined within a housing 205 has its diameter increased by a given amount to provided an enlarged portion 213a, the upper end of which defines a second valve element 221. The enlarged portion 213a of the piston 213 is formed with a plurality of openings 213b which axially extends therethrough. The plurality of openings 213b allows a communication between the inside and the outside of the piston 213. A stepped end face at the bottom of the enlarged portion 213a through which the lower end of each opening 213b opens is used as a third valve seat 232.

An annular, third valve element 233 is disposed in opposing relationship with the third valve seat 232, and is slidably fitted around the outer periphery of the piston 213 which is located below, as viewed in FIG. 4, the enlarged portion 213a. A spring 235 is disposed between an angular support member 234 which is secured to the outer periphery of the piston 213 and the third valve element 233. Accordingly, the third valve element 233 is normally urged toward the third valve seat 232 to be seated thereon. A combination of the plurality of openings 213b, the third valve seat 232, the third valve element 233 and the spring 235 forms a relief valve 231. As shown in FIGS. 3 and 4, the relief valve 231 is closed under the influence of the spring 235 in the inoperative condition of the brake booster 1.

In other respects, the arrangement is similar to that of the control valve 101 describe above in connection with the first embodiment, and accordingly, corresponding parts are designated by like numerals as used in the description of the first embodiment, to which 100 is added.

OPERATION

When the brake booster 1 of tandem type according to the second embodiment is to be operated as an automatic brake unit, a solenoid 207 is excited by a controller 210 to operate a solenoid operated switching valve 209 under the inoperative condition shown in FIGS. 3 and 4.

Thereupon, both rods 226, 227 and second valve seat 222 are driven downward, whereby a negative pressure valve 223 is closed and then an atmosphere valve 217 is opened. Accordingly, after the atmosphere within an atmosphere chamber 206 is introduced into a variable pressure chamber 203, the atmosphere is then introduced into the bellows chamber E of the brake booster 1 through the conduit 26. In this manner, the brake booster 1 functions as an automatic brake without operating a brake pedal. It will be understood that the atmosphere which is introduced into the variable pressure chamber 203 passes through the internal space of the piston 213 to act upon the second valve seat 222, thus enabling the atmosphere having a control pressure which depends on the magnitude of a current passing through the solenoid 207 to be introduced into the bellows chamber E.

Figure 5:
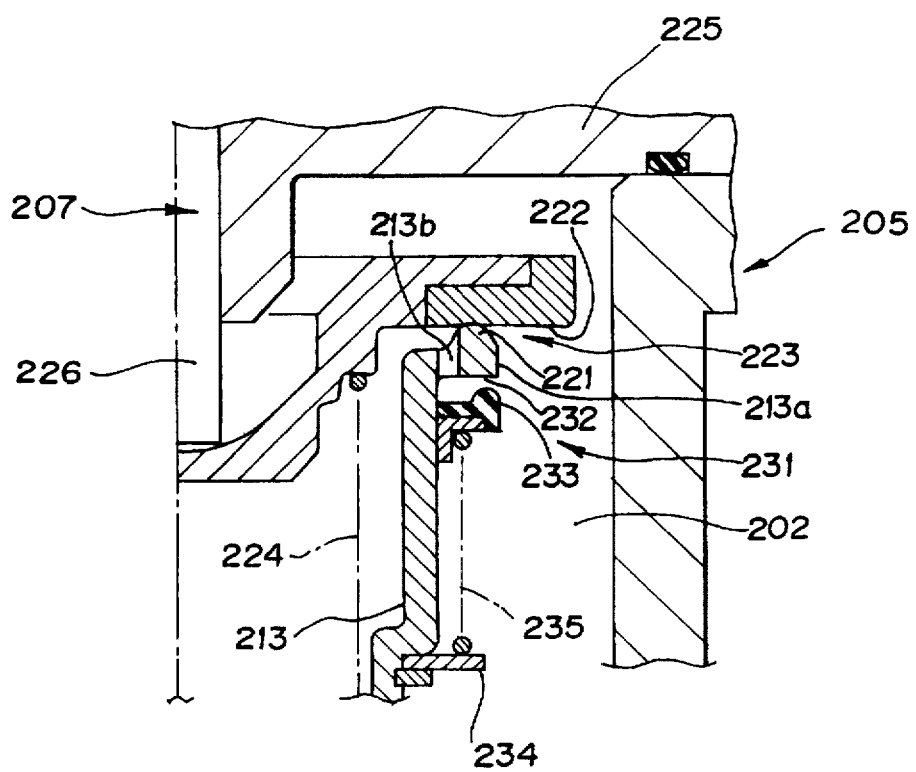
FIG. 5 is a cross section of a relief valve 231 which assumes a different condition from that shown in FIG. 4.

In the operative condition of the control valve 201, when a pressure differential between the variable pressure chamber 203 and the negative pressure chamber 202 reaches or exceeds a given value, the pressure differential acts on the third valve element 233 of the relief valve 231, thus compressing the spring 235. As a consequence, the third valve element 233 moves away from the third valve seat 232 to open the relief valve 231, as shown in FIG. 5.

Accordingly, a communication is established between the variable pressure chamber 203 and the negative pressure chamber 202 through the internal space of the piston 213 and the plurality of through-openings 213b formed in the enlarged portion 213a of the piston. This prevents a pressure differential between the control pressure (atmospheric pressure) within the variable pressure chamber 203 and the negative pressure within the negative pressure chamber 202 from exceeding a given value.

It will be apparent that the second embodiment functions in the similar manner and achieves a similar effect as in the first embodiment.

In addition, since the control valve 201 of the second embodiment is provided with the relief valve 231, in the event either rod 226, 227 undergoes a sticking in the operative condition of the control valve 201 or in the event the both rods 226, 227 undergo a sticking as a result of short-circuit of a coil contained in the solenoid 207, the relief valve 231 can be opened. In this manner, an upper limit for the control pressure which is produced within the variable pressure chamber 203 of the control valve 201 can be constrained. It is to be noted that an upper limit for the control pressure can be very easily changed by simply changing a load set upon the spring 235. Since the relief valve 231 is disposed around the outer periphery of the piston 213 at its upper portion, no additional space is required, and any increase in the size of the control valve 201 results from the provision of the relief valve 231.

While the invention has been described above in connection with several embodiments thereof, it should be understood that a number of changes, modifications and substitutions therein are possible by one skilled in the art from the above disclosure without departing from the scope and spirit of the invention defined by the appended claims.

What is claimed is:

1. A control valve including a negative pressure chamber formed in a housing and into which a negative pressure is normally introduced, a variable pressure chamber formed in the housing, an atmosphere chamber formed in the housing and into which an atmosphere is introduced, a valve mechanism disposed within the housing for switching communication between the individual chambers, and a solenoid secured to the housing for operating the valve mechanism;

wherein the valve mechanism comprises a piston disposed within the housing so as to be moveable and driven for movement when the solenoid is excited, a diaphragm extending across the piston and the housing for defining the negative pressure chamber and the atmosphere chamber, a negative pressure valve for interrupting a communication between the negative pressure chamber and the variable pressure chamber, and an atmosphere valve for establishing a communication between the atmosphere chamber and the variable pressure chamber upon movement of the piston, the diaphragm being substantially cylindrical in configuration and having one end connected to the housing and having an other end, said diaphragm having a portion folded back upon itself adjacent said one end, an inner periphery of the diaphragm being fitted around an outer peripheral surface of the piston in close contact therewith in a region located away from said other end and beyond said one end, said other end of said diaphragm having an increased thickness part defining a valve element, said housing having a valve seat formed therein, said valve element being adapted to seat on said valve seat formed in said housing.

2. A control valve including a negative pressure chamber formed in a housing and into which a negative pressure is normally introduced, a variable Pressure chamber formed in the housing, an atmosphere chamber formed in the housing and into which an atmosphere is introduced, a valve mechanism disposed within the housing for switching communication between the individual chambers, and a solenoid for operating the valve mechanism;

the valve mechanism comprising a piston disposed within the housing so as to be moveable and driven for movement when the solenoid is excited, a diaphragm extending across the piston and the housing for defining the negative pressure chamber and the atmosphere chamber, a negative pressure valve for interrupting a communication between the negative pressure chamber and the variable pressure chamber, and an atmosphere valve for establishing a communication between the atmosphere chamber and the variable pressure chamber upon movement of the piston, the diaphragm being substantially cylindrical in configuration and having one end connected to the housing and having a second end, said diaphragm having a portion folded back upon itself toward said one end, an inner periphery of the diaphragm being fitted around an outer peripheral surface of the piston in close contact therewith in a region located away from said one end and beyond the second end;

the piston being formed to be cylindrical, the piston having one axial end portion communicating with the negative pressure chamber and having a second axial end portion around which the diaphragm is fitted communicating with the variable pressure chamber, the second end of the diaphragm which is disposed within the variable pressure chamber defining an annular, first valve element, a step formed inside the housing and which is maintained in communication with the atmosphere chamber defining a first valve seat, a first spring urging the piston and the diaphragm toward the solenoid to cause the first valve element to be seated upon the first valve seat, a combination of the first valve element and the first valve seat defining the atmosphere valve, the one end portion of the piston which communicates with the negative pressure chamber defining a second valve element, a second valve seat which engages with or disengages from the second valve element being movable within the negative pressure chamber, a second spring urging the second valve element and the second valve seat in directions to cause them to be spaced apart, a combination of the second valve element and the second valve seat defining the negative pressure valve, the solenoid including a rod having its distal end disposed in abutment against the second valve seat disposed within the negative pressure chamber, the valve mechanism being such that when the solenoid is excited and atmosphere is introduced into the atmosphere chamber, the solenoid causes the rod to drive the second valve seat toward the second valve element to thereby close the negative pressure valve and to drive the second valve seat, the piston and the diaphragm to move against the resilience of the first spring to thereby open the atmosphere valve.

3. A control valve according to claim 2 in which the atmosphere chamber is arranged to be capable of communicating with the atmosphere through another switching valve which communicates with the atmosphere chamber, the switching valve preventing the introduction of the atmosphere into the atmosphere chamber when the solenoid is not excited and allowing the introduction of the atmosphere into the atmosphere chamber when the solenoid is excited.

4. A control valve according to claim 3, further including a stop disposed within the variable pressure chamber for constraining the movement of the diaphragm on which the first valve element is formed as it is driven against the resilience of the first spring, the solenoid including a frame having an axial portion which faces the negative pressure chamber on which a conical projection is formed, the second valve seat being substantially conical in configuration so that it engages the conical projection under the influence of the second spring when the solenoid is not excited, the axial portion of the frame of the solenoid inclusive of the projection being formed with a stepped guide opening having a bottom, stepped face, the guide opening including a portion of a reduced diameter and a portion of an increased diameter, said rod having a reduced diameter portion and an increased diameter portion, said reduced diameter portion of said rod being movably received in said reduced diameter portion of said guide opening, said increased diameter portion of said rod being movably received in said increased diameter portion of said guide opening, a third spring being disposed between a surface of the guide opening and the increased diameter rod for causing the increased diameter rod to abut against the reduced diameter rod and for causing the reduced diameter rod to abut against the second valve seat, the valve mechanism being such that in an inoperative condition when the solenoid is not excited, a first spacing between the stepped end face of the guide opening and an opposing end face of the increased diameter portion of the rod being greater than a sum of a second spacing between the second valve seat and the second valve element and a third spacing between the end of the diaphragm located within the variable pressure chamber and the stop.

5. A control valve including a negative pressure chamber formed in a housing and into which a negative pressure is normally introduced, a variable pressure chamber formed in the housing, an atmosphere chamber formed in the housing and into which an atmosphere is introduced, a valve mechanism disposed within the housing for switching communication between the individual chambers, and a solenoid for operating the valve mechanism;

the valve mechanism comprising a piston disposed within the housing so as to be moveable and driven for movement when the solenoid is excited, a diaphragm extending across the piston and the housing for defining the negative pressure chamber and the atmosphere chamber, a negative pressure valve for interrupting a communication between the negative pressure chamber and the variable pressure chamber, and an atmosphere valve for establishing a communication between the atmosphere chamber and the variable pressure chamber upon movement of the piston, the diaphragm being substantially cylindrical in configuration and having one axial end connected to the housing and an other end, the diaphragm having a portion folded back upon itself toward said one end, an inner periphery of the diaphragm being fitted around an outer peripheral surface of the piston in close contact therewith in a region located away from said one end and beyond the second end, the piston having a relief valve for communicating between the variable pressure chamber and the negative pressure chamber whenever a pressure differential between the negative pressure acting in the negative pressure chamber and the atmospheric pressure acting as a control pressure in the variable pressure chamber reaches or exceeds a given value.

6. A control valve according to claim 5, wherein the piston is generally cylindrical, hollow, and has an enlarged diameter portion, and the relief valve comprises a through-opening formed in the enlarged diameter portion of the piston to provide a communication path between the inside and the outside of the piston, a valve seat formed on a stepped end face of the enlarged diameter portion at a location where the through-opening opens into the negative pressure chamber, an annular valve element fitted around the outer periphery of the piston in a moveable manner and adapted to engage with or disengage from the valve seat, and a spring for urging the valve element into seating engagement with the valve seat.

7. A control valve according to claim 1 in which the variable pressure chamber communicates with a brake booster, and in which when the solenoid is excited, the atmospheric pressure introduced into the variable pressure chamber, which acts as a control pressure, is introduced into the brake booster to operate the brake booster without operating a brake pedal.

8. The control valve according to claim 1, wherein said valve element and valve seat form one of said atmosphere valve and said negative pressure valve.

9. The control valve according to claim 8, wherein said valve element and valve seat form said atmosphere valve.

10. The control valve according to claim 9, wherein said diaphragm has a cylindrical central portion between and connected to said one and other ends, said central portion being fitted to said outer peripheral surface of said piston, and said other end being freely moveable from said valve seat formed in said housing so that said atmosphere chamber communicates with said variable pressure chamber.

* * * * *